(12) United States Patent
Pavlov

(10) Patent No.: US 9,792,136 B2
(45) Date of Patent: Oct. 17, 2017

(54) HARDWARE ASSISTED INTER HYPERVISOR PARTITION DATA TRANSFERS

(75) Inventor: Vladimir Pavlov, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1243 days.

(21) Appl. No.: 13/096,680

(22) Filed: Apr. 28, 2011

(65) Prior Publication Data

US 2012/0278803 A1 Nov. 1, 2012

(51) Int. Cl.
*G06F 9/455* (2006.01)

(52) U.S. Cl.
CPC ............ *G06F 9/45558* (2013.01); *G06F 2009/45583* (2013.01)

(58) Field of Classification Search
CPC ............ G06F 9/45558; G06F 2009/45583
See application file for complete search history.

(56) References Cited

U.S. PATENT DOCUMENTS

| | | | |
|---|---|---|---|
| 6,725,284 B2 | 4/2004 | Arndt | |
| 6,973,510 B2 | 12/2005 | Arndt et al. | |
| 6,985,951 B2 | 1/2006 | Kubala et al. | |
| 7,069,413 B1* | 6/2006 | Agesen et al. | 711/207 |
| 7,334,076 B2* | 2/2008 | Hendel | G06F 9/544 |
| | | | 711/147 |
| 7,412,705 B2 | 8/2008 | Misra | |
| 7,613,898 B2* | 11/2009 | Haertel et al. | 711/206 |
| 7,870,298 B2 | 1/2011 | Shima et al. | |
| 7,996,569 B2* | 8/2011 | Aloni et al. | 709/250 |
| 8,001,543 B2* | 8/2011 | Wooldridge et al. | 718/1 |
| 2004/0215907 A1* | 10/2004 | Pizel | G06F 12/1475 |
| | | | 711/163 |
| 2005/0235068 A1 | 10/2005 | Moriki et al. | |
| 2005/0268047 A1* | 12/2005 | Aslot | G06F 12/1072 |
| | | | 711/147 |
| 2007/0028244 A1 | 2/2007 | Landis et al. | |
| 2007/0083862 A1 | 4/2007 | Wooldridge et al. | |
| 2007/0088829 A1* | 4/2007 | Shima | H04L 45/60 |
| | | | 709/226 |
| 2012/0216188 A1* | 8/2012 | Tsirkin | 718/1 |

OTHER PUBLICATIONS

Kleidermacher, "Hypervisors and the Power Architecture", http://www.edatechforum.com/eda-topics/embedded/hypervisors-and-the-power-architecture/, accessed Feb. 17, 2011, 1-8.

* cited by examiner

*Primary Examiner* — Wissam Rashid
*Assistant Examiner* — Jorge A Chu Joy-Davila
(74) *Attorney, Agent, or Firm* — Baker & Hostetler LLP

(57) ABSTRACT

An invention is disclosed for effectuating direct memory access (DMA) transfers by a guest operating system of a child partition. A guest operating system is presented with virtualized resources rather than physical resources—e.g. a virtualized processor, virtualized memory, and a virtualized DMA controller. When the guest OS attempts to initiate a DMA transfer using the virtualized DMA controller, the child partition detects this, and directs the physical DMA controller to conduct the DMA transfer.

20 Claims, 11 Drawing Sheets

US 9,792,136 B2

HARDWARE ASSISTED INTER HYPERVISOR PARTITION DATA TRANSFERS

BACKGROUND

A virtual machine is a software representation of a physical machine upon which programs execute. A virtual machine presents to a program, such as a guest operating system, software representation of physical resources, which may include virtualized versions of a central processing unit (CPU), system memory, and peripheral devices. Attempts by the guest operating system (OS) to access these virtual resources are typically received by the virtual machine, and then executed on a physical CPU of the physical host computer upon which the virtual machine executes.

There are several drawbacks with how virtual machines handle requests to utilize virtual resources, some of which are well known.

SUMMARY

One drawback with how virtual machines handle requests to utilize virtual resources is that most, or all, of their operations are executed by a physical CPU. This means that many operations that are not CPU bound when performed in a non-virtualized environment become CPU-bound when performed in a virtualized environment.

For example, many computers have a direct memory access (DMA) controller or peripherals with DMA capability. With DMA, data stored in memory may be copied to another memory location without requiring constant participation by the CPU. The CPU typically instructs the DMA controller on what to copy and where to copy it to. Then, the DMA controller handles the copying, while the CPU is free to perform other operations. When the DMA controller has completed the copying, it sends an interrupt to the CPU to inform the CPU that the copying has been completed.

This saving of CPU processing does not typically occur in a DMA transfer by a guest OS executing within a virtual machine because most operations from the VM are processed by a physical CPU. However, embodiments of the present invention address this problem. In an embodiment of the invention, the host partition is able to initiate DMA transfers on the physical computer. The VM in which the guest OS executes receives from the guest OS an instruction to perform a DMA transfer using the virtualized DMA controller of the VM. The VM receives this instruction and sends a message to the host partition indicative of executing the DMA transfer using the physical DMA controller. The host partition then executes the DMA transfer on the physical hardware using the CPU and the DMA controller.

In another embodiment of the invention, the VM is configured to directly communicate with the CPU to initiate a DMA transfer on the DMA controller. In such an embodiment, the VM detects an instruction from a guest OS that executes within the VM to initiate a DMA transfer. The VM then sends an instruction to the physical CPU indicative of the same, such that the transfer is performed by the CPU and DMA controller. Such an embodiment may comprise the use of an "enlightened" guest OS, which is configured to determine that it is executing within a VM, rather than directly upon physical hardware, and also to bypass virtualized devices that emulate physical devices, and access those physical devices directly.

Other embodiments of the invention are described with respect to the detailed description of the drawings.

DETAILED DESCRIPTION OF ILLUSTRATIVE EMBODIMENTS

Figure 1:
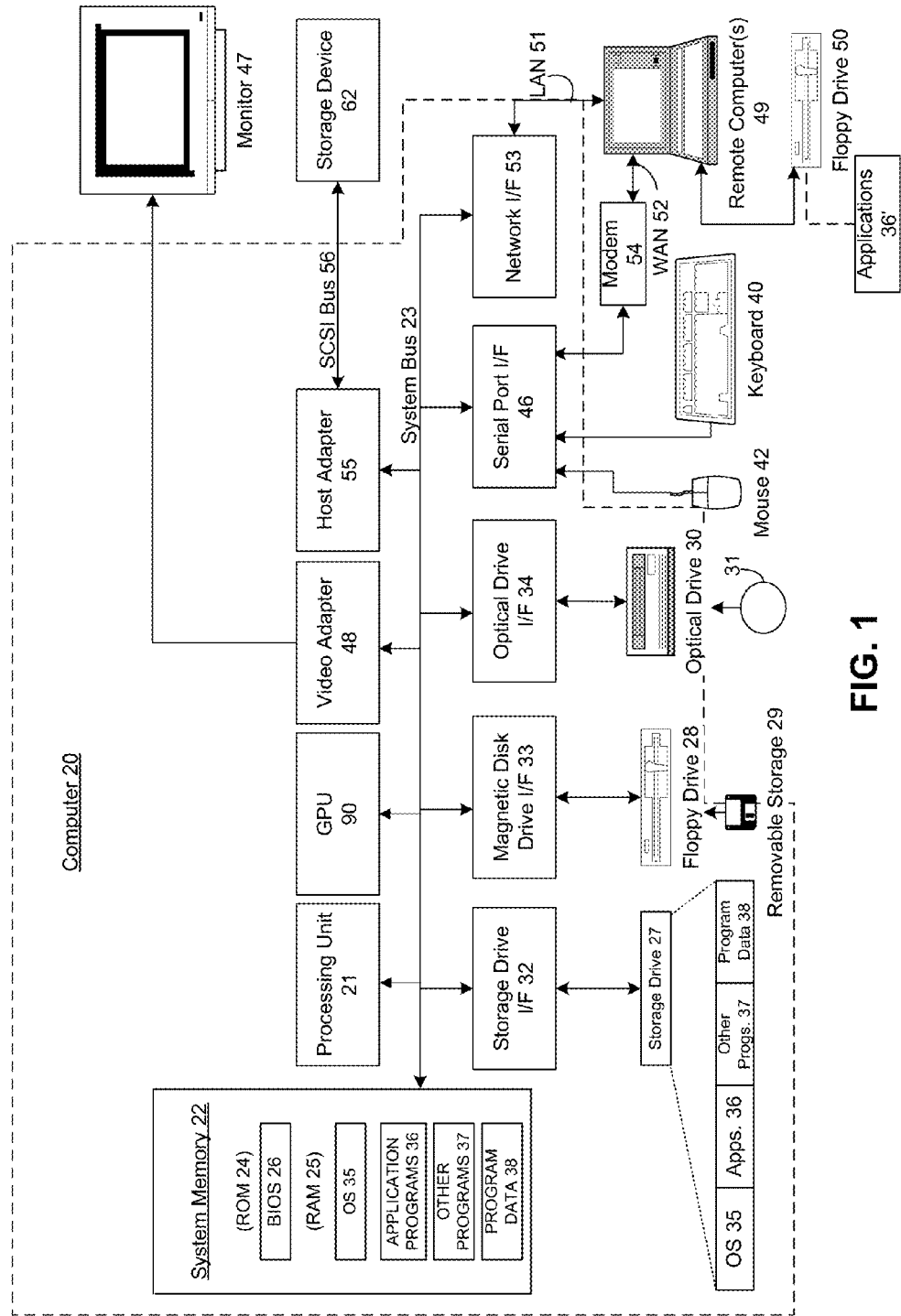
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20. Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
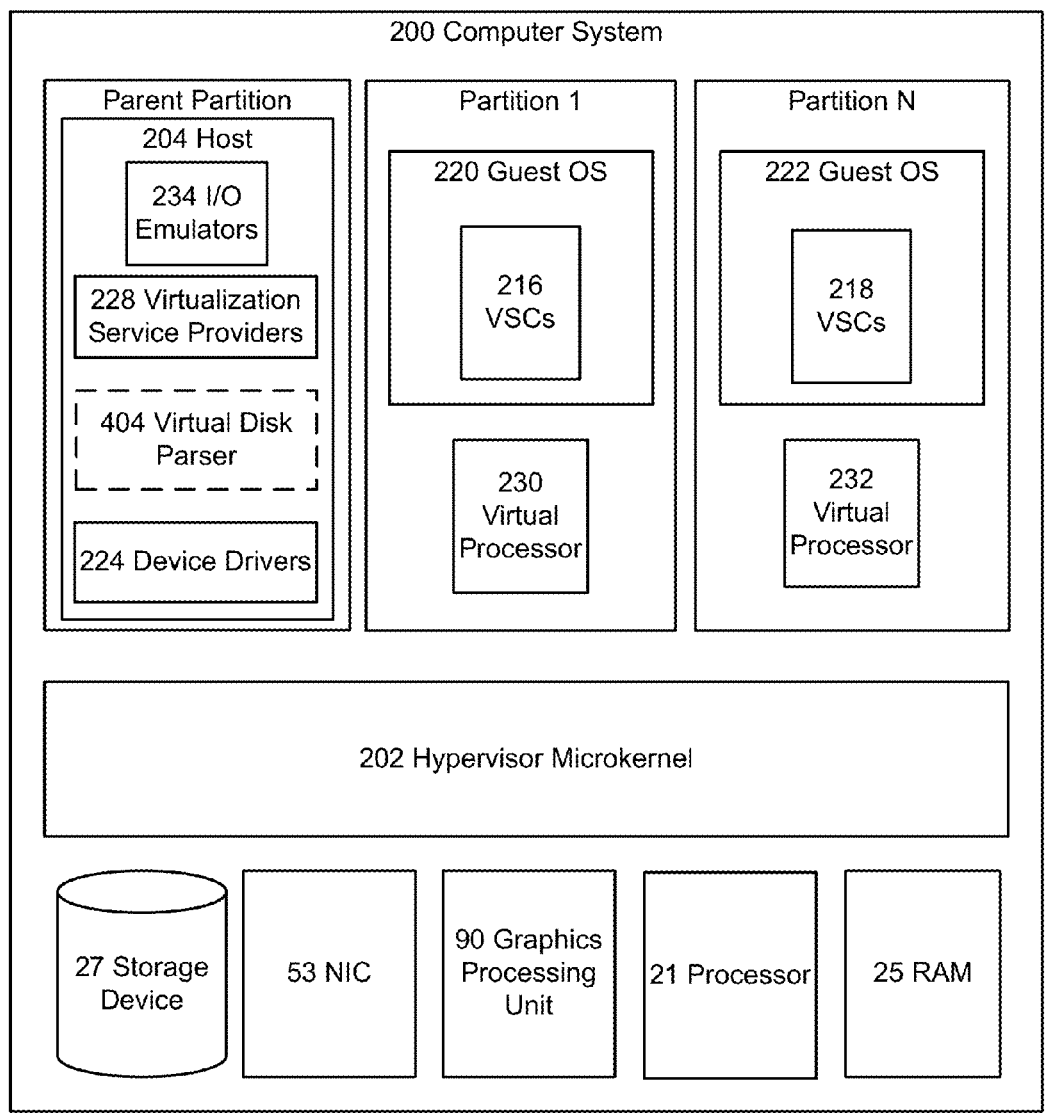
FIG. 2 depicts an example computing system containing a parent partition and a child partition, where data may be copied from the child partition to the parent partition in accordance with embodiments of the invention.

FIG. 2 illustrates an exemplary virtualization platform that can be used to generate virtual machines. In this embodiment, hypervisor microkernel 202 can be configured to control and arbitrate access to the hardware of computer system 200, and computer system 200 may be embodied within computer 20 of FIG. 1. Hypervisor microkernel 202 can generate execution environments called partitions such as child partition 1 through child partition N (where N is an integer greater than 1). Here, a child partition is the basic unit of isolation supported by hypervisor microkernel 202. Hypervisor microkernel 202 can isolate processes in one partition from accessing another partition's resources. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1–N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped device, microkernel hypervisor 202 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
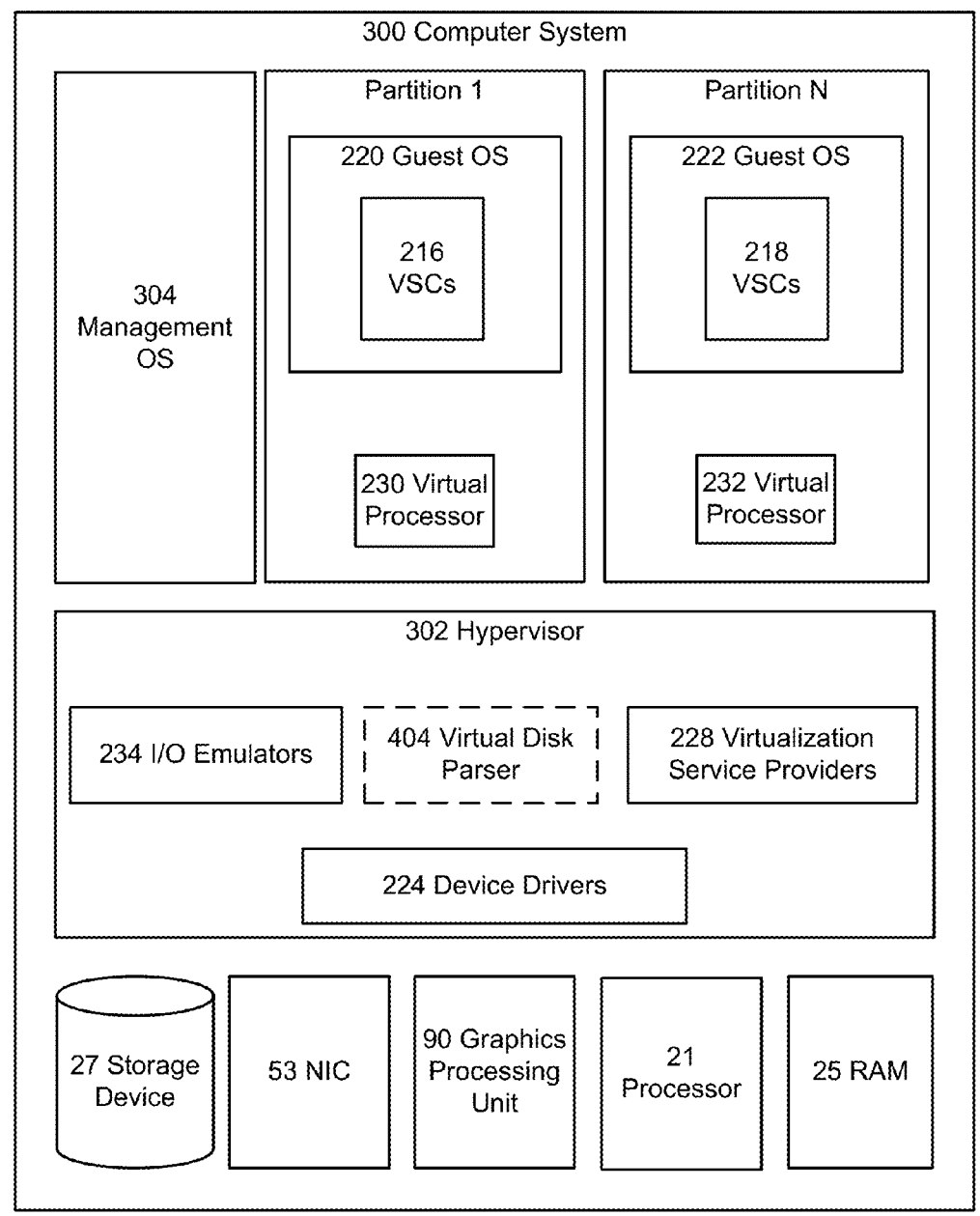
FIG. 3 depicts another example computing system containing a parent partition and a child partition, where data may be copied from the child partition to the parent partition in accordance with embodiments of the invention.

FIG. 3 illustrates an alternative virtualization platform to that described above in FIG. 2. FIG. 3 depicts similar components to those of FIG. 2; however, in this example embodiment hypervisor 302 can include a microkernel component and components similar to those in host 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2; however, in this architecture hypervisor 304 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits. Computer system 300 may be embodied within computer 20 of FIG. 1.

FIGS. 4-11 depict systems and operational procedures that utilize direct memory access transfers initiated by a child partition or VM. In embodiments, the systems and operational procedures disclosed herein may be implemented on the virtualized platforms of computer system 200 of FIG. 2 and computer system 300 of FIG. 3. In a direct memory access (DMA), some hardware resources of a host computer may read from or write to system memory independently of the CPU. The CPU may execute an instruction that results in sending an instruction to the DMA device to initiate the read/write, but the read/write itself is performed independently of the CPU inasmuch as the CPU may perform other operations while the DMA device carries out the read/write. When the DMA device has completed the read/write, it may send an interrupt to the CPU indicating that the read/write has been completed. Examples of hardware devices that commonly have DMA capability include dedicated DMA controllers, disk drive controllers, sound cards, GPUs, and network cards.

In a DMA transfer, a segment, or block, of memory is copied from a source device to a destination device (both of which may be the same device, with the source and destination being different locations on the device). In some system architectures, the DMA transfer is performed by a DMA controller. The communications bus via which this DMA transfer occurs is sometimes referred to as an ISA (Industry Standard Architecture) bus. In a PCI (Peripheral Component Interconnect) bus, PCI devices are configured to perform DMA transfers without the use of a separate DMA controller, inasmuch as the PCI device itself comprises its own DMA controller. This may be known as bus mastering DMA. In the bus mastering scenario, the PCI device involved with the transfer performs the transfer. There are also various system-on-a-chip architectures where a DMA controller or DMA engine is embedded within the one chip that also performs CPU functions.

In the primary embodiment discussed in the detailed description of the figures, one or more guest OSes and a host OS execute on a physical host computer. The guest OSes produce graphical output (e.g. application windows) in their memory space (referred to herein as a guest address space, which may be a portion of system memory reserved for the guest OS, which cannot be directly accessed by the host OS or another guest OS) and transfer this graphical output to the host OS's address space (referred to in as a physical address space, which may be a portion of system memory reserved for the host OS, which cannot be directly accessed by the guest OSes), which composites the graphical output to create a computer desktop, which is then displayed on a display device. The guest OSes transfer the graphical output to the host OS through a DMA transfer. In the prior art, the guest OSes would attempt to perform a DMA transfer using their virtualized hardware, and the VMs would then actually perform the transfer using the physical CPU of the host computer. In contrast, in the present invention, the guest OSes attempt to perform a DMA transfer using their virtualized hardware, and the VMs detect this and issue corresponding instructions to the physical hardware so that a DMA transfer is performed on the physical hardware, rather than a pure-CPU-based transfer.

Figure 4:
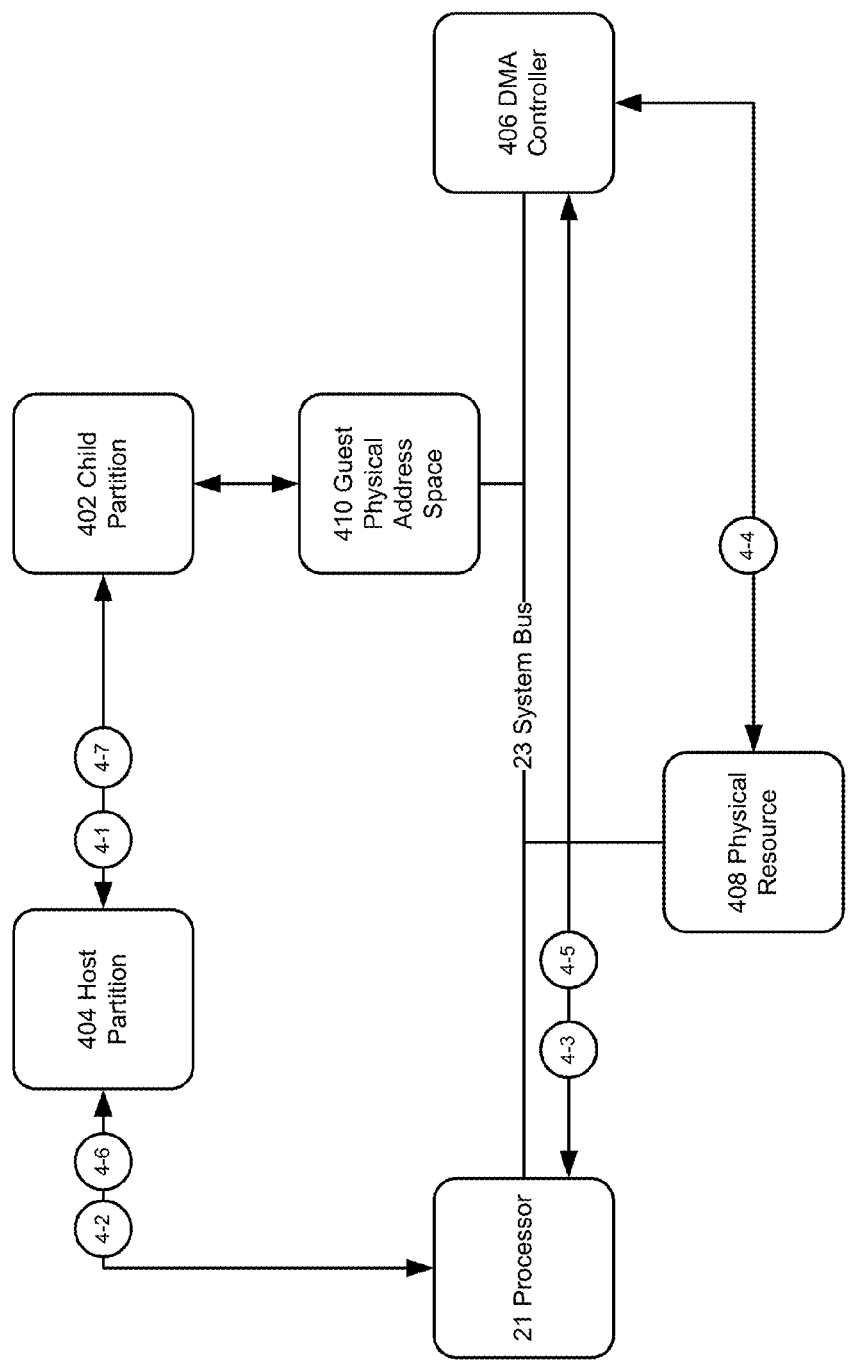
FIG. 4 depicts an example system where a child partition interacts with a host partition to use a DMA controller to transfer data between a guest physical address space and a physical resource.

FIG. 4 depicts an example system where a child partition interacts with a host partition to use a DMA controller to transfer data between a guest physical address space and a physical resource. The depicted elements of FIG. 4 may be embodied, for instance, in computer 20 of FIG. 1. Child partition 402 may be the partition 1 depicted in FIG. 2 or 3, and host partition 404 may be the parent partition of FIG. 2 or management OS 304 of FIG. 3.

Child partition 402 has access to a portion of system memory (such as system memory 22)—guest physical address space 410. This guest physical address space 410 is mapped to a virtual address space and provided to a guest OS of child partition 402.

In FIG. 4, child partition 402 may not have access to initiate a DMA transfer directly, but may need to interact with host partition 404 to initiate a DMA transfer. As such, child partition 402 may send 4-1 an indication to initiate a DMA transfer to host partition 404. This indication may be sent 4-1 via a shared memory transport from child partition 402 to host partition 404.

Host partition 404 may receive this indication to initiate a DMA transfer and, in response, send 4-2 an indication of the DMA transfer to processor 21. Host partition 404 may effectuate this sending 4-2 by having processor 21 execute one or more processor-executable instructions indicative of the transfer.

In response to processing this sent message 4-2, processor 21 may send 4-3 to DMA controller 406 an indication for the DMA controller 406 to conduct the DMA transfer. After sending message 4-3, processor 21 need not be involved in additional aspects of the data transfer, and may instead process other instructions that are not directly related to the data transfer.

In response to receiving message 4-3 from processor 21, DMA controller 406 then effectuates the data transfer without processor 21 devoting additional processor resources to the data transfer operation itself. Message 4-3 may comprise an indication of the source and destination of the data. As depicted in FIG. 4, the source is a portion of guest physical address space 410 of child partition 402, and the destination is physical resource 408. DMA controller 406 may effectuate the data transfer then, as depicted in communication 4-4, to transfer the data from guest physical address space 410 to physical resource 408.

In response to completing the data transfer in communication 4-4, DMA controller 406 then sends a communication 4-5 to processor 21 indicative of the data transfer being completed. Communication 4-5 may, for example, comprise a processor interrupt. A processor interrupt may comprise a signal sent to the CPU that causes the CPU to save its state and handle an event associated with the processor interrupt. In this case, the event is the completion of the DMA transfer.

All of communications 4-3, 4-4, and 4-5 may be sent via system bus 23, which is communicatively coupled to processor 21, DMA controller 406, physical resource 408, and guest physical address space 410. In response to receiving communication 4-5, processor 21 may then send communication 4-6 to host partition 404 that indicates that the data transfer has been completed. In turn, host partition 404 may send communication 4-7 to child partition 402, the communication 4-7 also indicating that the data transfer has been completed. In response to receiving communication 4-7, child partition 402 may free or otherwise use the resources in which the data was stored. In an embodiment, guest physical address space 410 may be a part of physical resource 408. For instance, physical resource 408 may comprise RAM or a hard disk, and guest physical address space 410 may comprise a subset of that RAM or hard disk.

Figure 5:
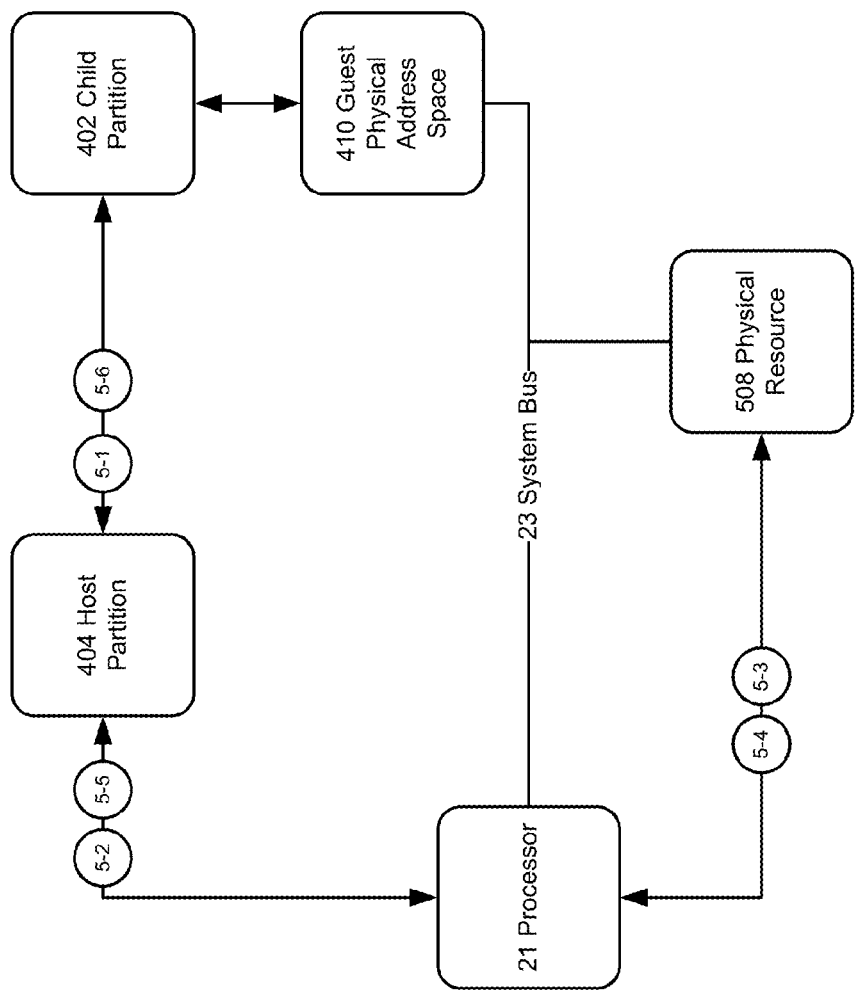
FIG. 5 depicts an example system where a child partition interacts with a host partition to DMA transfer data between a guest physical address space and a physical resource that has DMA capability.

FIG. 5 depicts an example system where a child partition interacts with a host partition to DMA transfer data between a guest physical address space and a physical resource that has DMA capability. A difference between the system of FIG. 5 and the system of FIG. 4 is that, in FIG. 5, physical resource 508 has DMA capability and can effectuate the data transfer without the use of a separate DMA controller, while in FIG. 4, physical resource 408 does not have DMA capability, and DMA controller 406 effectuates the data transfer to physical resource 408.

In FIG. 5, like in FIG. 4, child partition 402 may not have access to initiate a DMA transfer directly, but may need to interact with host partition 404 to initiate a DMA transfer. As such, child partition 402 may send 5-1 an indication to initiate a DMA transfer to host partition 404. This indication may be sent 5-1 via a shared memory transport from child partition 402 to host partition 404.

Host partition 404 may receive this indication to initiate a DMA transfer and, in response, send 5-2 an indication of the DMA transfer to processor 21. Host partition 404 may effectuate this sending 5-2 by having processor 21 execute one or more processor-executable instructions indicative of the transfer.

In response to processing this sent message 5-2, processor 21 may send 4-3 to physical resource 508 an indication for physical resource 508 to conduct the DMA transfer. After sending message 5-3, processor 21 need not be involved in additional aspects of the data transfer, and may instead process other instructions that are not directly related to the data transfer.

In response to receiving message 5-3 from processor 21, physical resource 408 then effectuates the data transfer without processor 21 devoting additional processor resources to the data transfer operation itself. Message 5-3 may comprise an indication of the source and destination of the data. The indication of the destination of the data may be the message itself being received by physical resource 508 (as opposed to being received by a second physical resource that may perform the data transfer). As depicted in FIG. 5, the source is a portion of guest physical address space 410 of child partition 402, and the destination is physical resource 508. Physical resource 508 may effectuate the data transfer by transferring the data from guest physical address space 410 to physical resource 508. Physical resource 508 may effectuate this data transfer across system bus 23, which it is communicatively coupled to, along with processor 21 and guest physical address space 410.

In response to completing the data transfer, physical resource 508 then sends a communication 5-4 to processor 21 indicative of the data transfer being completed. Communication 5-4 may, for example, comprise a processor interrupt.

In response to receiving communication 5-4, processor 21 may then send communication 5-5 to host partition 404 that indicates that the data transfer has been completed. In turn, host partition 404 may send communication 5-6 to child partition 402, the communication 5-6 also indicating that the data transfer has been completed. In response to receiving communication 5-6, child partition 402 may free or otherwise use the resources that the data was stored in.

Figure 6:
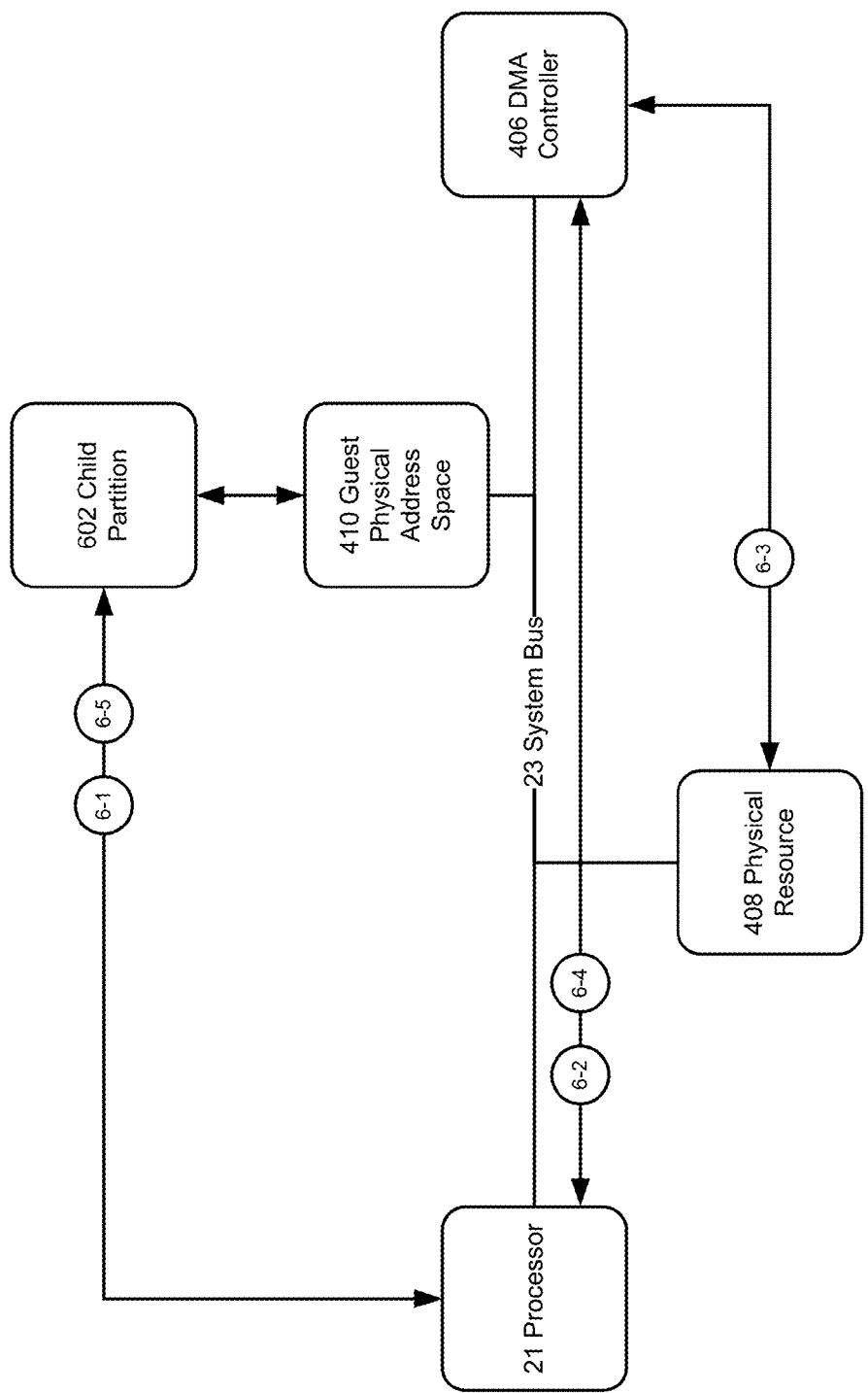
FIG. 6 depicts an example system where a child partition interacts with a DMA controller to transfer data between a guest physical address space and a physical resource.

FIG. 6 depicts an example system where a child partition interacts with a DMA controller to transfer data between a guest physical address space and a physical resource. A difference between the system of FIG. 6 and the system of FIG. 4 is that, in FIG. 4, child partition 402 is not configured to send an instruction to processor 21 indicative of initiating a DMA transfer, and thus sends such an instruction through host partition 404. In contrast, in FIG. 6, child partition 602 is configured to send an instruction to processor 21 indicative of initiating a DMA transfer, so this may be done without operations being performed by a host partition.

Child partition 602 has access to a portion of system memory (such as system memory 22)—guest physical address space 410. This guest physical address space 410 is mapped to a virtual address space and provided to a guest OS of child partition 602.

Child partition 602 initiates the DMA transfer by sending a communication 6-1 indicative of the same to processor 21. In response to processing this sent message 6-1, processor 21 may send 6-2 to DMA controller 406 an indication for the DMA controller 406 to conduct the DMA transfer. After sending message 6-2, processor 21 need not be involved in additional aspects of the data transfer, and may instead process other instructions that are not directly related to the data transfer.

In response to receiving message 6-2 from processor 21, DMA controller 406 then effectuates the data transfer without processor 21 devoting additional processor resources to the data transfer operation itself. Message 6-2 may comprise an indication of the source and destination of the data. As depicted in FIG. 6, the source is a portion of guest physical address space 410 of child partition 602, and the destination is physical resource 408. DMA controller 406 may effectuate the data transfer then, as depicted in communication 6-3, to transfer the data from guest physical address space 410 to physical resource 408.

In response to completing the data transfer in communication 6-3, DMA controller 406 then sends a communication 6-4 to processor 21 indicative of the data transfer being completed. Communication 6-4 may, for example, comprise a processor interrupt.

All of communications 6-2, 6-3, and 6-4 may be sent via system bus 23, which is communicatively coupled to processor 21, DMA controller 406, physical resource 408, and guest physical address space 410.

In response to receiving communication 6-4, processor 21 may then send communication 6-5 to child partition 602 that indicates that the data transfer has been completed. In response to receiving communication 6-5, child partition 602 may free or otherwise use the resources that the data was stored in.

Figure 7:
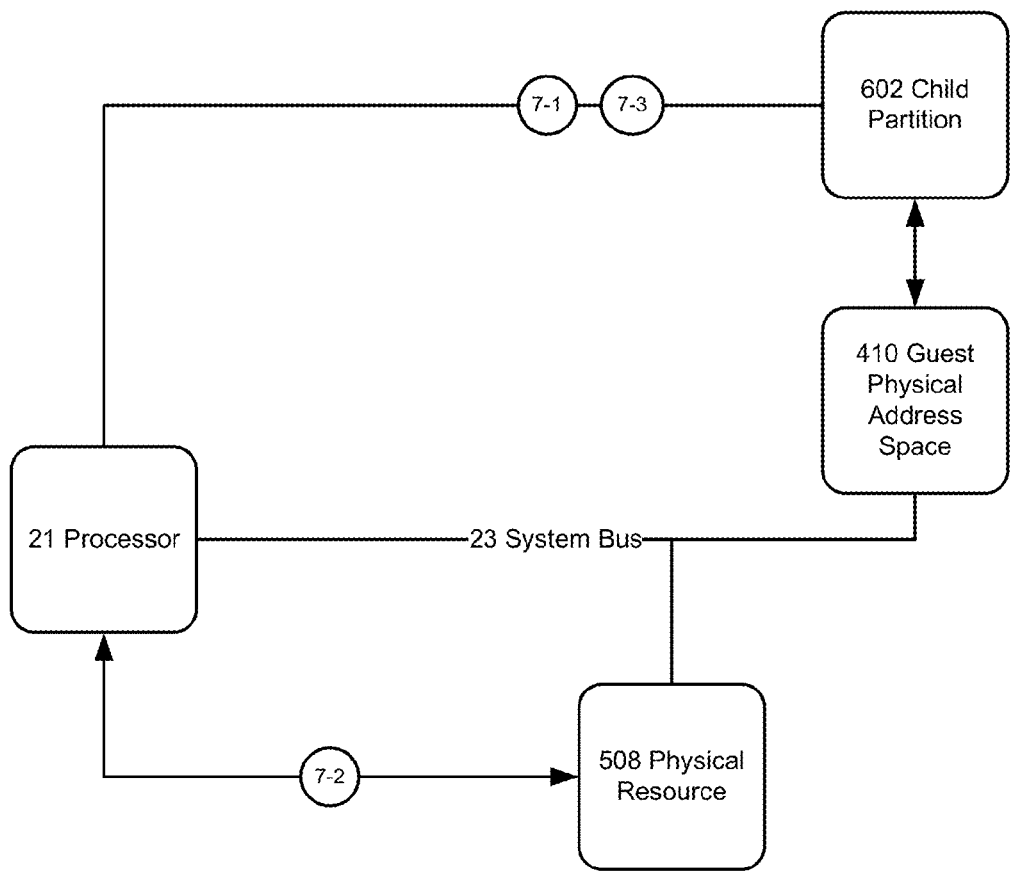
FIG. 7 depicts an example system where a child partition interacts with a physical resource that has DMA capability to DMA transfer data between a guest physical address space and the physical resource.

FIG. 7 depicts an example system where a child partition interacts with a physical resource that has DMA capability to DMA transfer data between a guest physical address space and the physical resource. A difference between the system of FIG. 7 and the system of FIG. 6 is that, in FIG. 7, physical resource 508 has DMA capability and can effectuate the data transfer without the use of a separate DMA controller, while in FIG. 6, physical resource 408 does not have DMA capability, and DMA controller 406 effectuates the data transfer to physical resource 408. This difference between the use of a physical resource with DMA capability and a separate DMA controller in FIGS. 7 and 6 is similar to those differences found in FIGS. 5 and 4.

Child partition 602 has access to a portion of system memory (such as system memory 22)—guest physical address space 410. This guest physical address space 410 is mapped to a virtual address space and provided to a guest OS of child partition 602.

Child partition 602 initiates the DMA transfer by sending a communication 7-1 indicative of the same to processor 21. In response to processing this sent message 7-1, processor 21 may send 7-2 to physical resource with DMA capability 508 a message indicative of the DMA transfer. After sending message 7-2, processor 21 need not be involved in additional aspects of the data transfer, and may instead process other instructions that are not directly related to the data transfer.

In response to receiving message 7-2 from processor 21, physical resource 508 then effectuates the data transfer without processor 21 devoting additional processor resources to the data transfer operation itself. Message 7-2 may comprise an indication of the source and destination of the data. The indication of the destination of the data may be the message itself being received by physical resource 508 (as opposed to being received by a second physical resource that may perform the data transfer). As depicted in FIG. 7, the source is a portion of guest physical address space 410 of child partition 602, and the destination is physical resource 508. Physical resource 508 may effectuate the data transfer by transferring the data from guest physical address space 410 to physical resource 508. Physical resource 508 may effectuate this data transfer across system bus 23, which it is communicatively coupled to, along with processor 21 and guest physical address space 410.

In response to completing the data transfer, physical resource 508 then sends a communication 7-3 to processor 21 indicative of the data transfer being completed. Communication 7-3 may, for example, comprise a processor interrupt.

Communications 7-2 and 7-3 may be sent via system bus 23, which is communicatively coupled to processor 21, DMA controller 406, physical resource 508, and guest physical address space 410. In response to receiving communication 7-3, processor 21 may then send communication 7-4 to child partition 602 that indicates that the data transfer has been completed. In response to receiving communication 7-4, child partition 602 may free or otherwise use the resources that the data was stored in.

Figure 8:
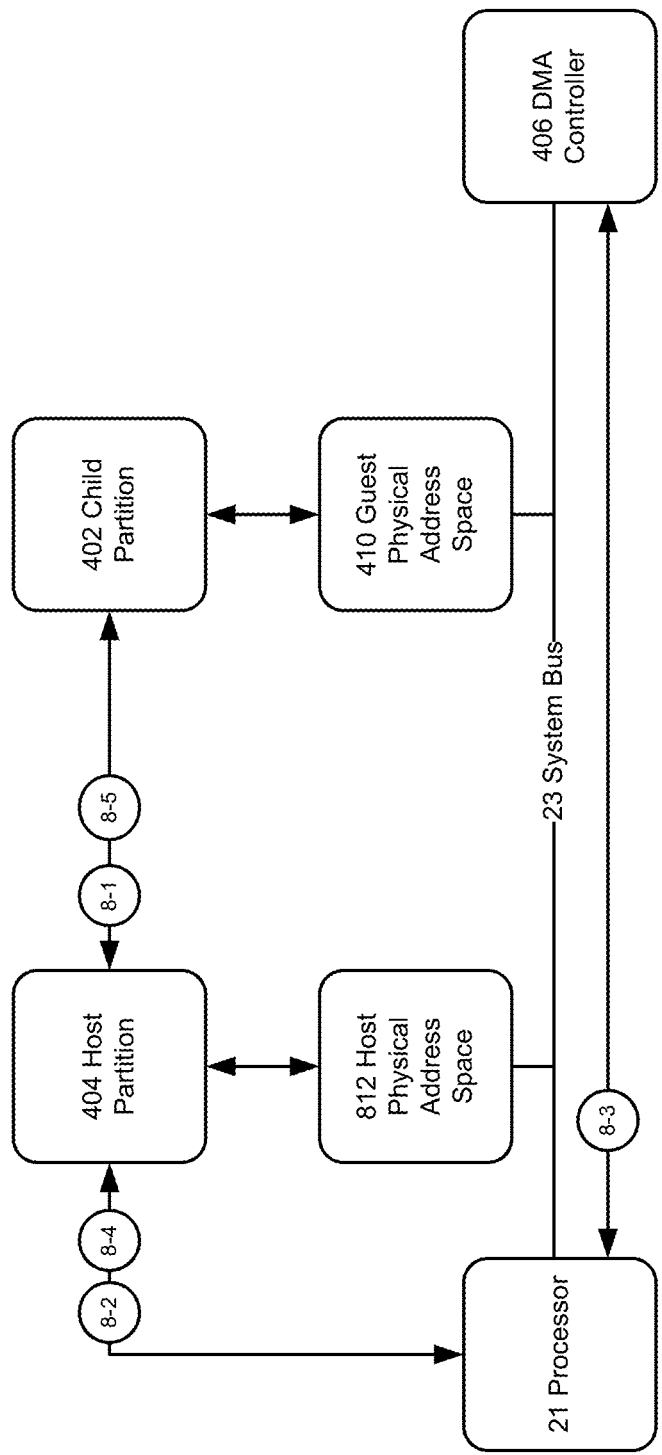
FIG. 8 depicts an example system where a child partition interacts with a host partition to use a DMA controller to transfer data between a guest physical address space and a physical address space.

FIG. 8 depicts an example system where a child partition interacts with a host partition to use a DMA controller to transfer data between a guest physical address space and a physical address space. A difference between the system of FIG. 8, and the system of FIG. 4, is that in FIG. 8, the destination is a physical address space of the host partition 404, whereas in FIG. 4, the destination is more generally a physical resource 408 (that, in some embodiments, may contain host physical address space 812). Child partition 402 has access to a portion of system memory (such as system memory 22)—guest physical address space 410. This guest physical address space 410 is mapped to a virtual address space and provided to a guest OS of child partition 402.

In FIG. 8, child partition 402 may not have access to initiate a DMA transfer directly, but may need to interact with host partition 404 to initiate a DMA transfer. As such, child partition 402 may send 8-1 an indication to initiate a DMA transfer to host partition 404. This indication may be sent 8-1 via a shared memory transport from child partition 402 to host partition 404.

Host partition 404 may receive this indication to initiate a DMA transfer and, in response, send 8-2 an indication of the DMA transfer to processor 21. Host partition 404 may effectuate this sending 8-2 by having processor 21 execute one or more processor-executable instructions indicative of the transfer.

In response to processing this sent message 8-2, processor 21 may send 8-3 to DMA controller 406 an indication for the DMA controller 406 to conduct the DMA transfer. After sending message 8-3, processor 21 need not be involved in additional aspects of the data transfer, and may instead process other instructions that are not directly related to the data transfer.

In response to receiving message 8-3 from processor 21, DMA controller 406 then effectuates the data transfer without processor 21 devoting additional processor resources to the data transfer operation itself. Message 8-3 may comprise an indication of the source and destination of the data. As depicted in FIG. 4, the source is a portion of guest physical address space 410 of child partition 402, and the destination is a portion of the host physical address space 812 of host partition 404. DMA controller 406 may effectuate the data transfer then, as depicted in communication 8-4, to transfer the data from guest physical address space 410 to physical resource 408.

In response to completing the data transfer, DMA controller 406 then sends a communication 8-4 to processor 21 indicative of the data transfer being completed. Communication 8-4 may, for example, comprise a processor interrupt. In response to receiving communication 8-4, processor 21 may then send communication 8-5 to host partition 404 that indicates that the data transfer has been completed. In turn, host partition 404 may send communication 8-6 to child partition 402, the communication 8-6 also indicating that the data transfer has been completed. In response to receiving communication 8-6, child partition 402 may free or otherwise use the resources that the data was stored in.

In an embodiment, guest physical address space 410 may be a part of physical resource 408. For instance, physical resource 408 may comprise RAM, and guest physical address space 410 may comprise a subset of that RAM.

Figure 9:
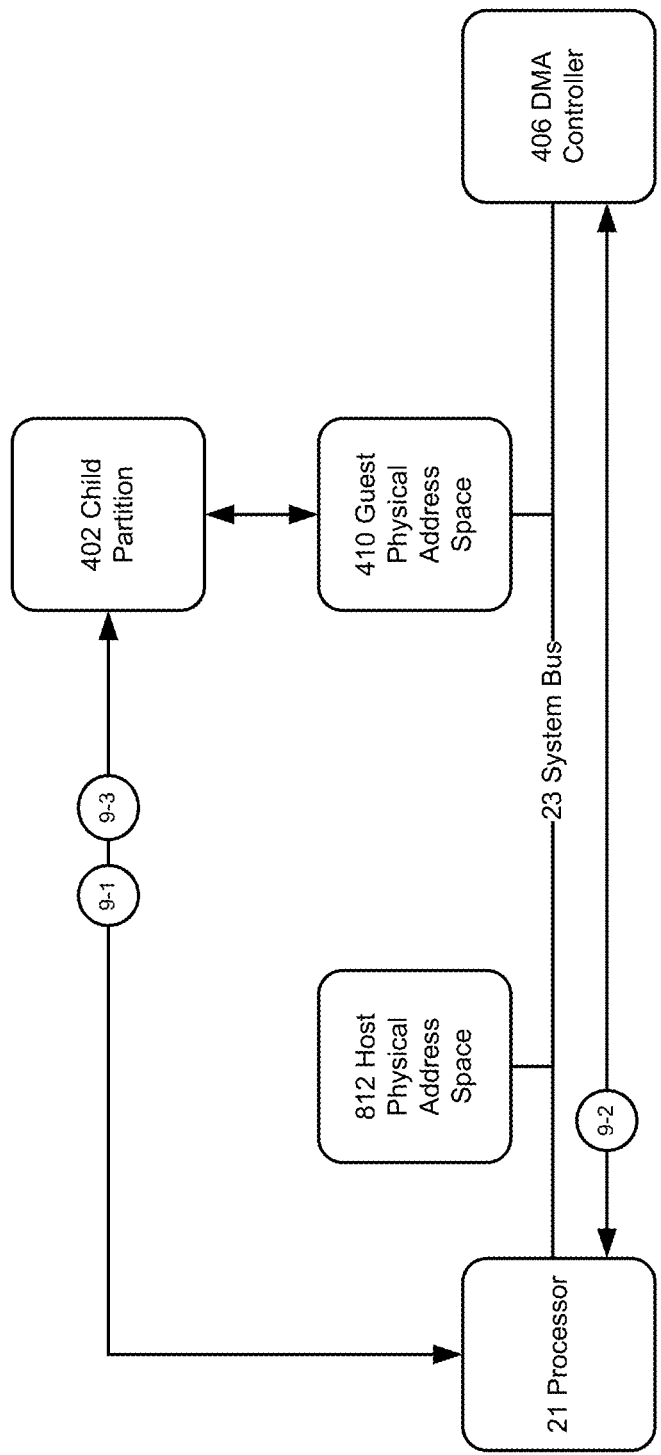
FIG. 9 depicts an example system where a child partition interacts with a DMA controller to transfer data between a guest physical address space and a physical address space.

FIG. 9 depicts an example system where a child partition interacts with a DMA controller to transfer data between a guest physical address space and a physical address space. A difference between the system of FIG. 9 and the system of FIG. 8 is that, in FIG. 8, child partition 402 is not configured to send an instruction to processor 21 indicative of initiating a DMA transfer, and thus sends such an instruction through host partition 404. In contrast, in FIG. 9, child partition 602 is configured to send an instruction to processor 21 indicative of initiating a DMA transfer, so this may be done without operations being performed by a host partition. This difference between FIG. 9 and FIG. 8 is similar to a difference found between FIG. 6 and FIG. 4.

Child partition 602 initiates the DMA transfer by sending a communication 9-1 indicative of the same to processor 21. In response to processing this sent message 9-1, processor 21 may send 9-2 to DMA controller 406 a message indicative of the DMA transfer. After sending message 9-2, processor 21 need not be involved in additional aspects of the data transfer, and may instead process other instructions that are not directly related to the data transfer.

In response to receiving message 9-2 from processor 21, DMA controller 406 then effectuates the data transfer without processor 21 devoting additional processor resources to the data transfer operation itself. Message 9-2 may comprise an indication of the source and destination of the data. As depicted in FIG. 9, the source is a portion of guest physical address space 410 of child partition 602, and the destination is a portion of host physical address space 812. DMA controller 406 may effectuate the data transfer by transferring the data from guest physical address space 410 to host physical address space 812. DMA controller 406 may effectuate this data transfer across system bus 23, which it is communicatively coupled to, along with processor 21, guest physical address space 410, and host physical address space 812.

In response to completing the data transfer, DMA controller 406 then sends a communication 9-3 to processor 21 indicative of the data transfer being completed. Communication 9-3 may, for example, comprise a processor interrupt. In response to receiving communication 9-3, processor 21 may then send communication 9-4 to child partition 602 that indicates that the data transfer has been completed. In response to receiving communication 9-4, child partition 602 may free or otherwise use the resources that the data was stored in.

Figure 10:
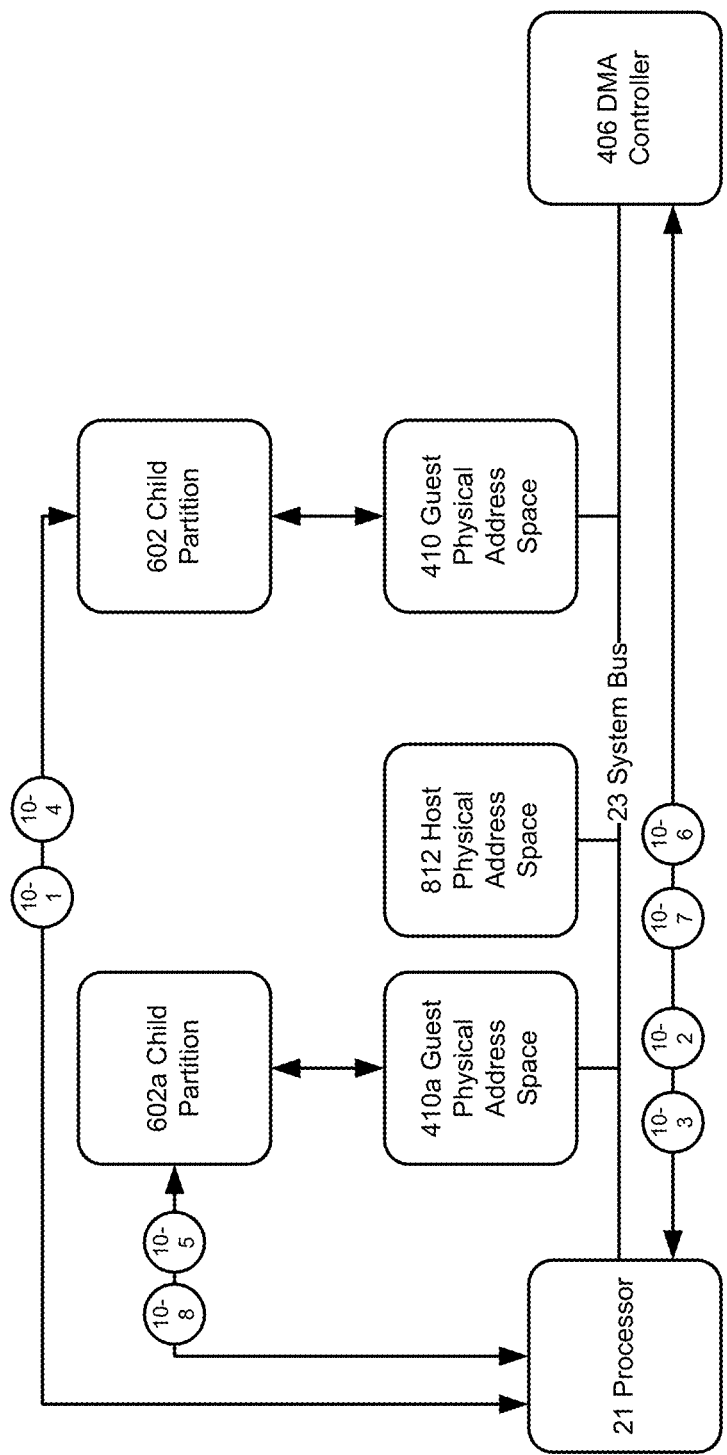
FIG. 10 depicts an example system where two child partitions interact with one DMA controller to transfer data between guest physical address spaces and a physical address space.

FIG. 10 depicts an example system where two child partitions interact with one DMA controller to transfer data between guest physical address spaces and a physical address space. As depicted in FIG. 10, this physical address space that each child partition transfers data to may be the same physical address space. That is, they may both be able to access and manipulate the same physical resource.

Child partition 602 initiates a first DMA transfer by sending a communication 10-1 indicative of the same to processor 21. In response to processing this sent message 10-1, processor 21 may send 10-2 to DMA controller 406 a message indicative of the DMA transfer. After sending message 10-2, processor 21 need not be involved in additional aspects of the data transfer, and may instead process other instructions that are not directly related to the data transfer.

In response to receiving message 10-2 from processor 21, DMA controller 406 then effectuates the data transfer without processor 21 devoting additional processor resources to the data transfer operation itself. Message 10-2 may comprise an indication of the source and destination of the data. As depicted in FIG. 10, the source is a portion of guest physical address space 410 of child partition 602, and the destination is a portion of host physical address space 812. DMA controller 406 may effectuate the data transfer by transferring the data from guest physical address space 410 to host physical address space 812. DMA controller 406 may effectuate this data transfer across system bus 23, which it is communicatively coupled to, along with processor 21, guest physical address space 410, guest physical address space 410a and host physical address space 812.

In response to completing the data transfer, DMA controller 406 then sends a communication 10-3 to processor 21 indicative of the data transfer being completed. Communication 10-3 may, for example, comprise a processor interrupt. In response to receiving communication 10-3, processor 21 may then send communication 10-4 to child partition 602 that indicates that the data transfer has been completed. In response to receiving communication 10-4, child partition 602 may free or otherwise use the resources that the data was stored in.

Child partition 602a may initiate a similar communication flow to effectuate the transfer of data from guest physical address space 410a to host physical address space 812 as child portion 602 initiated to effectuate the transfer of data from guest physical address space 410 to host physical address space 812. For instance, communication flow 10-5 may be similar to communication flow 10-1, communication flow 10-6 may be similar to communication flow 10-2, communication flow 10-7 may be similar to communication flow 10-3, and communication flow 10-8 may be similar to communication flow 10-4.

In an embodiment, both child partition 602 and child partition 602a may effectuate the transfer of data not just to host physical address space 812, but to the same portion of host physical address space. This may comprise either the exact same portion of host physical address space 812, or an overlapping portion of host physical address space 812.

Figure 11:
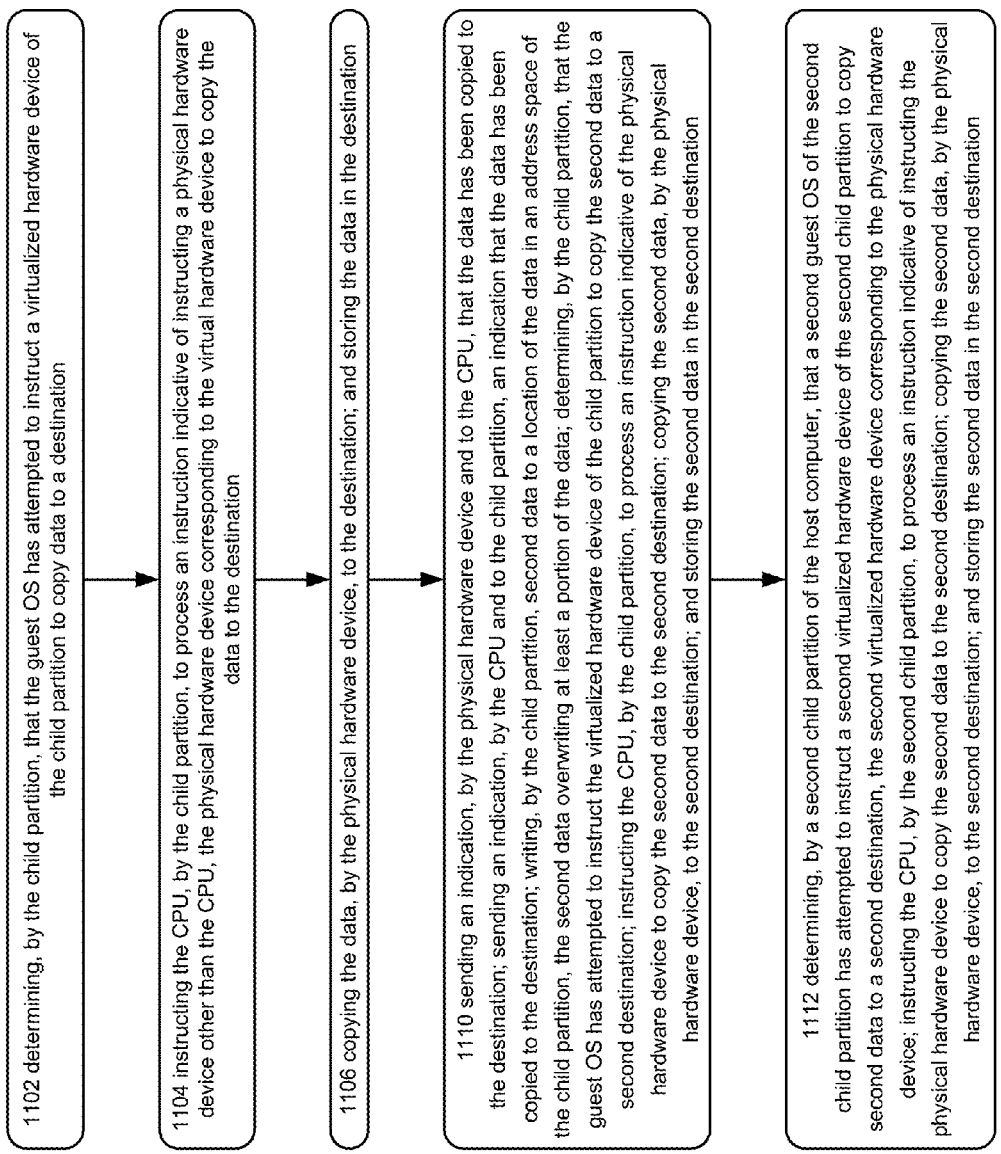
FIG. 11 depicts example operational procedures for effectuating DMA transfers in a virtual machine.

FIG. 11 depicts example operational procedures for effectuating DMA transfers in a virtual machine. The operational procedures of FIG. 11 may be implemented to offload copying data from a child partition from a central processing unit (CPU) of a host computer having a host partition, the child partition comprising a guest operating system (OS). It may be appreciated that not all operations are implemented in all embodiments of the invention.

Operation 1102 depicts determining, by the child partition, that the guest OS has attempted to instruct a virtualized hardware device of the child partition to copy data to a destination. This determination may comprise a virtual machine (VM) of the child partition receiving an instruction from the guest OS intended for a virtual CPU of the VM (and a corresponding virtual DMA controller, or virtual device with DMA capability) indicative of this attempt. That is, the child partition may present to the guest OS virtual hardware resources, and the guest OS may attempt to access these virtual hardware resources to effectuate a DMA data transfer.

Operation 1104 depicts instructing the CPU, by the child partition, to process an instruction indicative of instructing a physical hardware device other than the CPU to copy the data to the destination, the physical hardware device corresponding to the virtual hardware device. This may comprise, for example, communication flows 4-1 and 4-2 of FIG. 4, communication flows 5-1 and 5-2 of FIG. 5, communication flow 6-1 of FIG. 6, communication flow 7-1 of FIG. 7, communication flows 8-1 and 8-2 of FIG. 8, communication flow 9-1 of FIG. 9, or communication flow 10-1 of FIG. 10.

In an embodiment, instructing the CPU to process the instruction comprises: sending, from the child partition and to the host partition, an indication of instructing the CPU to process the instruction; and instructing the CPU, by the host partition, to process the instruction indicative of instructing physical hardware device to copy the data to the destination, the physical hardware device corresponding to the virtual hardware device. This embodiment may comprise communication flows 4-1 and 4-2 of FIG. 4, communication flows 5-1 and 5-2 of FIG. 5, and communication flows 8-1 and 8-2 of FIG. 8.

In an embodiment, sending, from the child partition and to the host partition, an indication of instructing the CPU to process the instruction comprises translating, by the host partition, a location of the data in a virtual address space of the child partition to a location of the data in an address space of the host partition. For instance, where data is stored in system memory in a location, that location may be addressed in different ways by the child partition and the host partition. A child partition may work with a virtual address space—a mapping of the physical address space (or a portion thereof) to a separate address space for the child partition. Likewise, a host partition may work with its own address space, which is a similar mapping from the physical address space to another address space used by the host partition. In embodiments where this occurs, the child partition may refer to the location in the physical address space in terms of its virtual address space. In response to receiving the instruction from the child partition, the host partition may then translate the reference using the virtual address space to a corresponding location in the host's address space that also refers to that location in the physical address space.

In an embodiment, instructing the CPU, by the host partition, to process the instruction indicative of a physical hardware device corresponding to the virtual hardware device to copy the data to the destination comprises translating, by the host partition, a location of the data in an address space of the host partition to a location of the data in a physical address space. Similar to how the host partition may translate between a child partition's virtual address space, and the host partition's address space, the host partition may also translate between the host partition's address space and the physical address space, to produce a reference to the physical address space to be used by the physical hardware device.

In an embodiment, sending, from the child partition and to the host partition, an indication of instructing the CPU to process the instruction comprises sending the instruction, by the child partition and to the host partition, across a shared memory transport. Some implementations of a shared memory transport may be referred to as a VMBus, or virtual machine bus. In a shared memory transport, both the child partition and the host partition may have access to write to and read from the same physical memory location (though they may address that location differently, in terms of their respective address spaces, as discussed above). Then, the child partition may write to that physical memory location, as well as writing a signal that there is data in the shared memory transport to a second physical memory location that both partitions may access. Later, the host partition may read from the second physical memory location and, from that, determine that there is data in the shared memory transport to be read, and read that data. This may comprise communication flow 4-1 of FIG. 4, communication flow 5-1 of FIG. 5, or communication flow 8-1 of FIG. 8.

In an embodiment, instructing the CPU, by the child partition, to process an instruction indicative of a physical hardware device other than the CPU, the physical hardware device corresponding to the virtual hardware device to copy the data to the destination further comprises instructing, by the CPU, a direct memory access (DMA) controller of the host computer to copy the data to the destination, and copying, by the DMA controller, the data to the destination, the destination being part of the physical hardware device. This may comprise communication flow 4-3 of FIG. 4, communication flow 5-3 of FIG. 5, communication flow 6-2 of FIG. 6, communication flow 7-2 of FIG. 7, communication flow 8-3 of FIG. 8, communication flow 9-2 of FIG. 9, and communication flow 10-2 of FIG. 10.

Operation 1106 depicts copying the data, by the physical hardware device, to the destination; and storing the data in the destination. This may be effectuated via a DMA transfer. In an embodiment, this may be effectuated by a DMA controller, such as DMA controller 406, or by a physical resource with DMA capability. In embodiments, this may be effectuated by causing the CPU to instruct the physical hardware device to write or transfer the data to the destination.

Operation 1108 depicts sending an indication, by the physical hardware device and to the CPU, that the data has been copied to the destination; sending an indication, by the CPU and to the child partition, that the data has been copied to the destination; writing, by the child partition, second data to a location of the data in an address space of the child partition, the second data overwriting at least a portion of the data; determining, by the child partition, that the guest OS has attempted to instruct the virtualized hardware device of the child partition to copy the second data to a second destination; instructing the CPU, by the child partition, to process an instruction indicative of instructing the physical hardware device to copy the second data to the second destination; copying the second data, by the physical hardware device, to the second destination; and storing the second data in the second destination. In an embodiment, operation 1108 may comprise communication flows 4-5, 4-6, and 4-7 of FIG. 4, communication flows 5-4, 5-5, and 5-6 of FIG. 5, communication flows 6-4 and 6-5 of FIG. 6, communication flows 7-2 and 7-3 of FIG. 7, communication flows 8-3, 8-4, and 8-5 of FIG. 8, communication flows 9-2 and 9-3 of FIG. 9, and communication flows 10-3 and 10-4 of FIG. 10.

After these communication flows have been effectuated, the child partition may then attempt to initiate a second DMA transfer using the same data as before, or new data (or a combination of the two), and to effectuate that transfer to the same physical location as before, or a new location (or a combination of the two). This second transfer may be effectuated in a manner similar to operations 1102-1106 of FIG. 11.

Operation 1110 depicts determining, by a second child partition of the host computer, that a second guest OS of the second child partition has attempted to instruct a second virtualized hardware device of the second child partition to copy second data to a second destination, the second virtualized hardware device corresponding to the physical hardware device; instructing the CPU, by the second child partition, to process an instruction indicative of instructing the physical hardware device to copy the second data to the second destination; copying the second data, by the physical hardware device, to the second destination; and storing the second data in the second destination.

Multiple child partitions may effectuate DMA transfers in an embodiment of the invention. This second child partition may utilize the same physical resource as the original child partition to effectuate the transfer (e.g. DMA controller 406, or physical resource with DMA capability 508). The second child partition may also effectuate a transfer to the same physical memory location as the first child partition transferred data to. In this manner, both child partitions may be thought of as having equal access to both the physical resource that effectuates the transfer and to the physical memory location that is the destination (in embodiments, the respective child partitions may use the same physical resource but may be isolated from transferring data to the same physical memory location). This operation 1110 may be effectuated in a similar manner as operations 1102-1106 of FIG. 11.

While the present disclosure has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for offloading data transfer operations between a virtualized hardware device and a first child partition among a plurality of child partitions from a central processing unit (CPU) of a host computer having a host partition, the method comprising:

determining, by the first child partition, that a guest system operating on the first child partition has attempted to instruct a virtualized hardware device of the first child partition to copy first data to a first destination allocated to a second child partition of the host computer, wherein the first destination has a physical address allocated to the second child partition;

in response to determining, instructing the CPU, by a virtual machine manager (VMM) that controls access to physical memory by the first child partition and the second child partition, to process a first instruction indicative of instructing a controller or a physical resource having direct access to physical memory to write the first data to the first destination; and sending a message from the virtual machine manager (VMM) to the first child partition indicative of the status of the data transfer.

2. The method of claim 1, further comprising:
sending, from the first child partition to the VMM, an indication of instructing the CPU to process the first instruction.

3. The method of claim 2, wherein sending, from the first child partition to the VMM, the indication of instructing the CPU to process the first instruction comprises:
translating, by the VMM, a location of the first data in a virtual address space of the first child partition to a location of the first data in an address space of the host partition.

4. The method of claim 2, wherein sending, from the first child partition to the VMM, the indication of instructing the CPU to process the first instruction comprises:
translating, by the VMM, a location of the first data in an address space of the host partition to a location of the first data in a physical address space.

5. The method of claim 2, wherein sending, from the first child partition to the VMM, the indication of instructing the CPU to process the first instruction comprises:
sending the first instruction, by the first child partition and to the VMM, across a shared memory transport.

6. The method of claim 1, further comprising:
sending an indication, by the physical hardware device and to the CPU, that the first data has been written to the first destination;
sending an indication, by the CPU and to the first child partition, that the first data has been written to the first destination;
writing, by the first child partition, second data to a location of the first data in an address space of the first child partition, the second data overwriting at least a portion of the first data;
determining, by the first child partition, that the guest system has attempted to instruct the virtualized hardware device of the first child partition to write the second data to a second destination;
instructing the CPU, by the first child partition, to process an instruction originated by the first child partition indicative of instructing the physical hardware device to write the second data to the second destination; and
causing the CPU to instruct the physical hardware device to write the first data to the first destination.

7. The method of claim 1, further comprising:
instructing, by the CPU, a direct memory access (DMA) controller of the host computer to write the first data to the first destination; and
writing, by the DMA controller, the first data to the first destination, the first destination being part of the physical hardware device.

8. The method of claim 1, further comprising:
determining, by a second child partition of the host computer, that a second guest system of the second child partition has attempted to instruct a second virtualized hardware device of the second child partition to write second data to a second destination, the second virtualized hardware device corresponding to the physical hardware device;
instructing the CPU, by the VMM, to process an instruction indicative of instructing the physical hardware device to write the second data to the second destination; and
causing the CPU to instruct the physical hardware device to write the second data to the second destination.

9. A system for offloading data transfer operations between a virtualized hardware device and a first child partition among a plurality of child partitions, the system comprising:
a processor; and a memory communicatively coupled to the processor when the system is operational, the memory bearing processor-executable instructions that, upon execution by the processor, cause the system at least to:
determine, by the first child partition, that a guest system operating on the first child partition has attempted to instruct a virtualized hardware device of the first child partition to write first data to a first destination allocated to a second child partition of the system, wherein the first destination has a physical address allocated to the second child partition;
in response to determining, instruct a CPU, by a virtual machine manager (VMM) that controls access to physical memory by the first child partition and the second child partition, to process an instruction indicative of instructing a controller or a physical resource having direct access to physical memory to write the first data to the first destination to instruct the controller or the physical resource having direct access to physical memory to write the first data to the first destination; and
sending a message from the virtual machine manager (VMM) to the first child partition indicative of the status of the data transfer.

10. The system of claim 9, wherein the processor-executable instructions that, upon execution by the processor, cause the system at least to instruct the CPU to process the instruction further cause the system at least to:
send, from the first child partition and to the VMM, an indication of instructing the CPU to process the instruction.

11. The system of claim 10, wherein the memory further bears processor-executable instructions that, upon execution by the processor, further cause the system at least to:
translate, by the VMM, a location of the first data in a virtual address space of the first child partition to a location of the first data in an address space of the host partition.

12. The system of claim 10, wherein the memory further bears processor-executable instructions that, upon execution by the processor, cause the system at least to:
translate, by the VMM, a location of the first data in an address space of the host partition to a location of the first data in a physical address space.

13. The system of claim 10, wherein the memory further bears processor-executable instructions that, upon execution by the processor, cause the system at least to:
send the instruction, by the first child partition and to the VMM, across a shared memory transport.

14. The system of claim 9, wherein the memory further bears processor-executable instructions that, upon execution by the processor, further cause the system at least to:
send an indication, by the physical hardware device and to the CPU, that the first data has been written to the first destination;
send an indication, by the CPU and to the first child partition, that the first data has been written to the first destination;
write, by the first child partition, second data to a location of the first data in an address space of the first child partition, the second data overwriting at least a portion of the first data;

determine, by the first child partition, that the guest system has attempted to instruct the virtualized hardware device of the first child partition to write the second data to a second destination;

instruct the CPU, by the first child partition, to process an instruction indicative of instructing the physical hardware device to write the second data to the second destination;

write the second data, by the physical hardware device, to the second destination; and store the second data in the second destination.

15. The system of claim 9, wherein the memory further bears processor-executable instructions that, upon execution by the processor, cause the system at least to:

instruct, by the CPU, a direct memory access (DMA) controller of the host computer to write the first data to the first destination; and write, by the DMA controller, the first data to the first destination, the first destination being part of the physical hardware device.

16. The system of claim 9, wherein the memory further bears processor-executable instructions that, upon execution by the processor, further cause the system at least to:

determine, by a second child partition of the host computer, that a second guest system of the second child partition has attempted to instruct a second virtualized hardware device of the second child partition to write second data to a second destination, the second virtualized hardware device corresponding to the physical hardware device;

instruct the CPU, by the second child partition, to process an instruction indicative of instructing the physical hardware device to write the second data to the second destination; and cause the CPU to instruct the physical hardware device to write the first data to the first destination.

17. A non-transitory computer-readable storage medium for offloading data transfer operations between a virtualized hardware device and a first child partition among a plurality of child partitions, bearing computer-readable instructions that when executed cause performance of operations including:

determining, by the first child partition, that a guest system operating on the first child partition has attempted to instruct a virtualized hardware device of the first child partition to write first data to a first destination allocated to a second child partition of the host computer, wherein the first destination has a physical address allocated to the second child partition;

in response to determining, instructing the CPU, by a Virtual Machine Manager (VMM) that controls access to physical memory by the first child partition and the second child partition, to process an instruction indicative of instructing a controller or a physical resource having direct access to physical memory to write the first data to the first destination; and sending a message from the virtual machine manager (VMM) to the first child partition indicative of the status of the data transfer.

18. The non-transitory computer-readable storage medium of claim 17, further bearing instructions that when executed cause performance of operations including:

sending, from the first child partition and to the VMM, an indication of instructing the CPU to process the instruction.

19. The non-transitory computer-readable storage medium of claim 17, further bearing instructions that when executed cause performance of operations including:

sending an indication, by the physical hardware device and to the CPU, that the first data has been written to the first destination;

sending an indication, by the CPU and to the first child partition, that the first data has been written to the first destination;

writing, by the first child partition, second data to a location of the first data in an address space of the first child partition, the second data overwriting at least a portion of the first data;

determining, by the first child partition, that the guest system has attempted to instruct the virtualized hardware device of the first child partition to write the second data to a second destination;

instructing the CPU, by the first child partition, to process an instruction indicative of instructing the physical hardware device to write the second data to the second destination; and causing the CPU to instruct the physical hardware device to write the second data to the second destination.

20. The non-transitory computer-readable storage medium of claim 17, further bearing instructions that when executed cause performance of operations including:

determining, by a second child partition of the host computer, that a second guest system of the second child partition has attempted to instruct a second virtualized hardware device of the second child partition to write second data to a second destination, the second virtualized hardware device corresponding to the physical hardware device;

instructing the CPU, by the second child partition, to process an instruction indicative of instructing the physical hardware device to write the second data to the second destination; and causing the CPU to instruct the physical hardware device to write the second data to the second destination.

* * * * *